US009158639B2

(12) United States Patent
Hu et al.

(10) Patent No.: US 9,158,639 B2
(45) Date of Patent: Oct. 13, 2015

(54) METHOD AND APPARATUS FOR CORRELATING INPUT AND OUTPUT MESSAGES OF SYSTEM UNDER TEST (71) Applicant: International Business Machines Corporation, Armonk, NY (US)

(72) Inventors: Guoqiang Hu, Shanghai (CN); Li Jun Mei, Beijing (CN); HuaFang Tan, Beijing (CN); Bo Yang, Beijing (CN); Yu Yuan, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 199 days.

(21) Appl. No.: 13/904,555

(22) Filed: May 29, 2013

(65) Prior Publication Data
US 2013/0326276 A1  Dec. 5, 2013

(30) Foreign Application Priority Data

May 31, 2012  (CN) .......................... 2012 1 0177617

(51) Int. Cl.
G06F 11/00 (2006.01)
G06F 11/26 (2006.01)
G06F 11/36 (2006.01)
G06F 11/30 (2006.01)
G06F 11/273 (2006.01)

(52) U.S. Cl.
CPC .............. *G06F 11/26* (2013.01); *G06F 11/273* (2013.01); *G06F 11/302* (2013.01); *G06F 11/3003* (2013.01); *G06F 11/3051* (2013.01); *G06F 11/3664* (2013.01)

(58) Field of Classification Search
CPC ... G06F 11/26; G06F 11/273; G06F 11/3003; G06F 11/3006; G06F 11/3017; G06F 11/302; G06F 11/3041; G06F 11/3051; G06F 11/3466; G06F 11/3664; G06F 11/3636; G06F 11/362; G06F 11/3688; G06F 11/3692; G06F 11/3676
USPC .......................................................... 714/37
See application file for complete search history.

(56) References Cited

U.S. PATENT DOCUMENTS 6,249,755 B1   6/2001  Kliger
8,041,996 B2  10/2011  Barker
8,473,926 B2 *  6/2013  Metzgen ....................... 717/131
2010/0281304 A1 * 11/2010  Moyer et al. .................... 714/37

OTHER PUBLICATIONS

Muller, Event Correlation Engine, Swiss Federal Institute of Technologyh Zurich Department of Information Technology and Electircal Engineering Master's Thesis, 2009.
Ding et al., Dual Processor Performance Characterization for XML Application-Oriented Networking, 2007 ICPP, Sep. 10-14, 2007, pp. 52.
Dwoskin et al., A Framework for Testing Hardware-Software Security Architectures, Princeton University Department of Electrical Engineering Technical Report, Jun. 2009.
Kliger et al., A Coding Approach to Event Correlation, 4th IEEEIFIP International Symposium on Integrated Network Management, May 1995, pp. 266-277.

* cited by examiner

*Primary Examiner* — Bryce Bonzo
*Assistant Examiner* — Anthony J Amoroso
(74) *Attorney, Agent, or Firm* — Jeff Tang (57) ABSTRACT A method and apparatus for determining correlation between input and output messages in a system under test (SUT) is provided in the present invention. The SUT is provided with preset watch-points, and the running of the SUT is detected by triggering watch-points in a test platform at its run time. The method includes the steps of: upon detecting a message input operation, finding a variable that stores an input message, associating the variable with a tag of the input message, and adding a watch-point for the variable in the test platform; as well as, upon detecting network output operation, finding a variable that stores an output message of the SUT; and determining correlation between the output message and an input message according to a tag associated with the variable that stores the output message.

23 Claims, 5 Drawing Sheets

METHOD AND APPARATUS FOR CORRELATING INPUT AND OUTPUT MESSAGES OF SYSTEM UNDER TEST

CROSS-REFERENCE TO RELATED APPLICATION

This application claims priority under 35 U.S.C. §119 from China Patent Application No. 201210177617.1 filed May 31, 2012 the entire contents of which are incorporated herein by reference.

BACKGROUND OF THE INVENTION

1. Field of the Invention

The present invention relates to the computer field, and more specifically, to a method and apparatus for determining correlation between input and output messages of a system under test.

2. Description of Related Art

The Internet of Things (IOT) has been considered an important component of new generation information technologies, and is defined as a network connecting things to the internet through information sensing devices, for example, Radio Frequency Identification (RFID), infrared sensors, Global Positioning System (GPS), laser scanners, etc., according to agreed protocols for information exchanging and communication, so as to realize intelligent identification, locating, tracking, monitoring, and management of things.

In distributed networks, such as the IOT, functional test is an important stage in system development and malfunction detection. For example, in a system of collecting temperature information for alert, temperature sensors distributed at different locations sense temperature and send collected temperature information to a certain node, which determines whether to send alert information for alert according to the received temperature information. In such an IOT, whether the designed node meets design requirements, or a certain output event, is dictated by which input event or events at the node can be determined by the functional test.

When a system (it can be a node or a portion thereof in a network, or a part formed by multiple nodes in the network) has been designed, performing a functional test on the system is required to determine whether the system can meet design requirements. For a faulted system it is possible to perform functional test on the system to locate malfunction. Because a system may receive a large number of input messages and send a large number of output messages, conveniently determining correlation between input and output messages to facilitate functional test has become a major demand.

Recently, several methods for testing correlation between input and output messages in a network have emerged. In these methods, correlation between input and output messages is determined through semantic analysis, that is, the specific meaning of data contained in input and output messages needs to be parsed for correlation analysis. In doing so, either a great deal of human effort is involved, or data modeling through a huge amount of statistics is necessary, leading to high complexity.

Currently, there are several code analysis tools. For example, the Wisconsi tool may find out associated variables and/or functions from codes through static code analysis without executing the codes. The JSlice tool relies on special Java Virtual Machine (JVM) which records code execution paths through executing codes and finds out associated variables and/or functions following the code execution paths. The SPYDER tool records code dependency trees based on probes used for monitoring which are embedded into executable machine codes at code compiling time, and thereby finds out associated variables and/or functions according to the code dependency trees. The probes cannot be changed during code execution. The above tools are either inaccurate or rigid or intruding for the codes of systems under tests. They are not generally applicable in determining correlation between input and output messages conveniently and accurately.

SUMMARY OF THE INVENTION

The present invention provides a method and apparatus of determining correlation between input and output messages in a system under test by means of watch-points and tags in a simple and convenient way, without the need for performing semantic analysis on messages and the need for instrumenting codes, recording and analyzing the complete execution paths of codes.

The present invention provides a method for determining correlation between input and output messages in a system under test (SUT) having preset watch-points in a test platform, the method includes the steps of: upon detecting a message input operation, finding a variable that stores an input message, associating the variable with a tag of the input message, and adding a watch-point for the variable in the test platform; as well as, upon detecting network output operation, finding a variable that stores an output message of the SUT; and determining correlation between the output message and an input message according to a tag associated with the variable that stores the output message.

The present invention also provides an apparatus for determining correlation between input and output messages in a system under test (SUT) having preset watch-points in a test platform, the apparatus includes: a process module for associating a variable with a tag of an input message and for adding a watch-point for the variable, in response to detecting the variable associated with the input message; as well as, a correlation determining module for determining correlation between an output message and an input message according to a tag associated with a variable for storing the output message, in response to detecting the variable for storing the output message of the SUT.

BRIEF DESCRIPTION OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION OF THE PREFERRED EMBODIMENTS

Some preferable embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure, and for conveying the scope of the present disclosure to those skilled in the art.

In accordance with the present invention, through setting watch-points, variables having relation to input messages can be tracked without paying attention to the specific execution flow inside source codes, and through assigning tags, different variables influenced by the same input message can be associated with the same tag. Thus, correlation between input and output messages can be determined simply and conveniently with watch-points and tags, and semantic analysis from the semantic level can be avoided.

Figure 1:
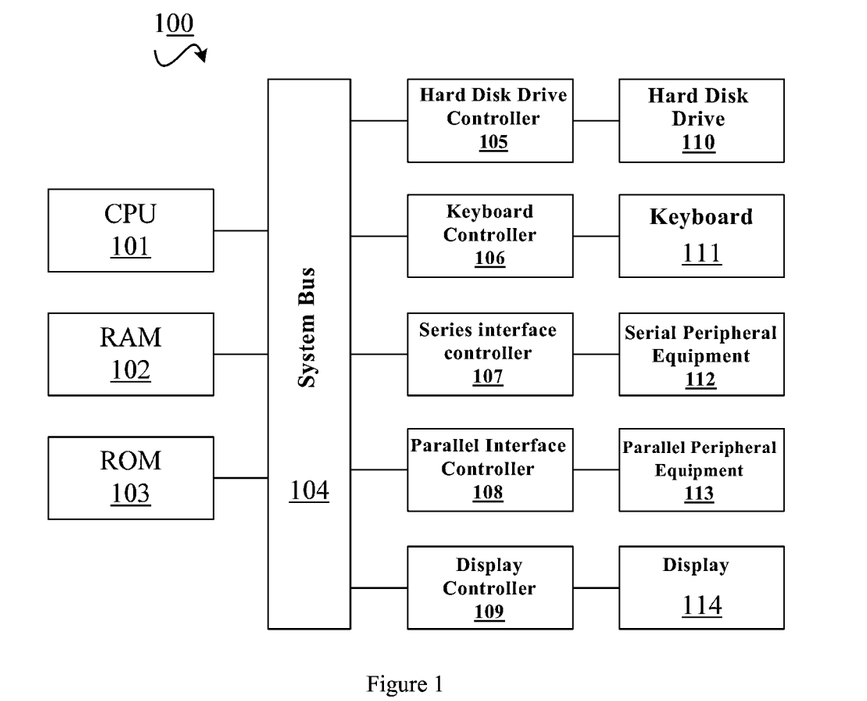
FIG. 1 shows an exemplary computer system that is applicable to implement the embodiments of the present invention.

Referring to FIG. 1, an exemplary computer system 100 is shown, which is applicable to implement the embodiments of the present invention. As shown in FIG. 1, the computer system 100 may include: CPU (Central Process Unit) 101, RAM (Random Access Memory) 102, ROM (Read Only Memory) 103, System Bus 104, Hard Drive Controller 105, Keyboard Controller 106, Serial Interface Controller 107, Parallel Interface Controller 108, Display Controller 109, Hard Drive 110, Keyboard 111, Serial Peripheral Equipment 112, Parallel Peripheral Equipment 113 and Display 114. Among above devices, CPU 101, RAM 102, ROM 103, Hard Drive Controller 105, Keyboard Controller 106, Serial Interface Controller 107, Parallel Interface Controller 108 and Display Controller 109 are coupled to the System Bus 104. Hard Drive 110 is coupled to Hard Drive Controller 105. Keyboard 111 is coupled to Keyboard Controller 106. Serial Peripheral Equipment 112 is coupled to Serial Interface Controller 107. Parallel Peripheral Equipment 113 is coupled to Parallel Interface Controller 108. And, Display 114 is coupled to Display Controller 109. It should be understood that the structure as shown in FIG. 1 is only for the exemplary purpose rather than any limitation to the present invention. In some cases, some devices may be added to or removed from the computer system 100 based on specific situations.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 2:
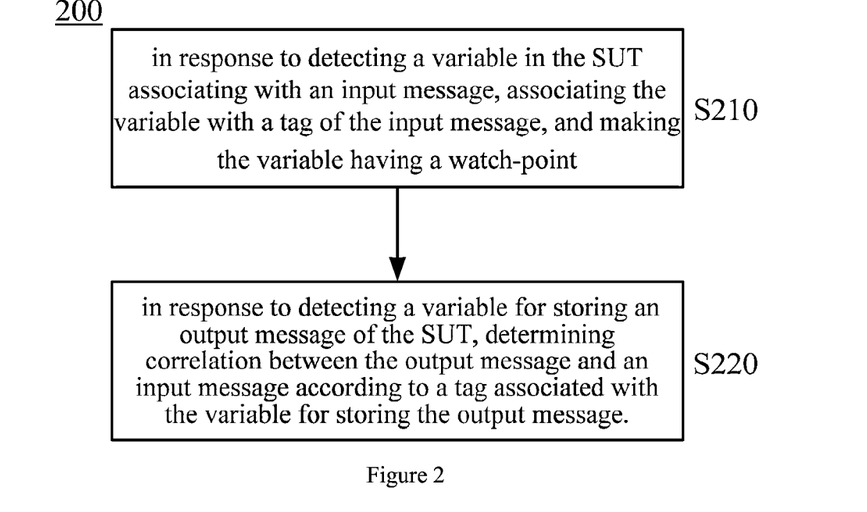
FIG. 2 shows a flow chart of a method for determining correlation between input and output messages according to an embodiment of the present invention.

With reference herein after to FIG. 2, the method 200 of determining correlation between input and output messages according to an embodiment of the present invention will be described. Herein, according to embodiments of the present invention, input and output messages refer to input and output messages of a system under test (SUT); the SUT is tested through loading the SUT into a test platform to execute. The test platform may comprise test run time environment, such as, JVM (Java Virtual Machine), JVMTI (Java Virtual Machine Tool Interface), GDB (GNU Project Debugger), etc.

The method 200 comprises: at step S210, upon detecting a message input operation, executing the following operations: finding the variable that stores the input message, associating the variable with a tag of the input message, and adding a watch-point in the test platform for this variable; at step S220, upon detecting network output operation, finding the variable that stores the output message of the SUT, determining correlation between the output message and an input message according to a tag associated with the variable storing the output message.

In the method 200, with the execution of the SUT on the test platform, through setting watch-points for the SUT and associating all variables related to an input message with a tag corresponding to this input message, correlation between input and output messages can be determined according to tags. A variable related to an input message refers to a variable directly or indirectly related to the input message, namely, the input message imposes influences directly or indirectly on the variable. The imposed influence may comprise an influence on the value of the variable, or may comprise an influence on variable control. For example, if information A in an input message directly changes the value of a variable X, or changes the value of the variable X through an intermediate variable, then the variable X is related to the input message. As another example, if information A in an input message causes a variable X to be produced or changes the value of the variable X in the case that information A satisfies a certain condition, then the variable X is also related to the input message.

Further, in step S210, when a variable is determined to be related to an input message according to a watch-point that has been set, the variable is associated with a tag corresponding to the input message (hereinafter also referred to as a tag of the input message), and in the case that there is no watch-point toggled on the variable, a watch-point is set to the variable. In contrast, in the case that there has been a watch-point set to the variable, the watch-point is kept for the variable. The watch-point that has been set may be a watch-point set beforehand or a watch-point newly set with the execution of step S210. Specifically, the watch-point set beforehand may be a watch-point that is set in the test platform after the SUT is loaded into the test platform and before the SUT is executed, or a watch-point that is embedded in the SUT in advance before the SUT is loaded into the test platform.

According to an embodiment of the present invention, a watch-point can be preset for an input function for receiving an input message. Thus, when it is determined based on the set watch-point that the input function is invoked to receive the input message, a variable for storing the input message can be detected.

According to an embodiment of the present invention, a watch-point can be preset to an output function for sending an output message. Thus, when it is determined based on the set watch-point that the output function is invoked to output the output message, since it can be determined which variable of the output function stores the output message according to the output function, correlation can be determined according to a tag associated with the determined variable for storing the output message.

Generally, network interfaces of the SUT perform network input/output through invoking library functions, and different network interfaces may have library functions in the same form in case of supporting the same network protocols and employing the same programming language and operating system. These network interfaces may receive an input message through invoking an input function (for example, the receive( ) function), and send output messages through invoking an output function (for example, the send( ) function). When it is required to determine correlation between input and output messages of the SUT, input and output functions in the SUT can be found out in advance and watch-points can be set to them respectively, so that when the SUT runs to the positions corresponding to the input and output functions, since the watch-points are encountered, the steps in method 200 are triggered to perform. Herein, input and output functions can also be referred to as input and output methods in some programming languages (such as C++), the specific names of which do not make any limitation to the present invention.

Because different SUTs may support different network protocols and employ different programming languages and operating systems, a test specification of an SUT may be first obtained, and then input and output functions required to be set with watch-points are determined according to the obtained test specification. In this way, for different SUTs, input and output functions can be properly identified and thus the initial watch-points that is utilized for the input and output functions can be properly set. The test specification may comprise network protocols supported by an SUT required to be tested currently and programming languages and operating system of the SUT. Undoubtedly, those skilled in the art may conceive of test specifications in other forms. Through specifying a test specification of an SUT, input and output functions of the SUT can be determined.

For example, in order to determine input and output functions through the test specification, a code pattern can be predefined. The code pattern may be identified through the test specification, and the input and output functions may be identified through the code pattern. The code pattern can be represented in a table with the following fields: a library or package encapsulating the network input/output (I/O) functions, a function (for procedural programming language) implementing the network I/O, a class and method (for object-oriented programming language) implementing the network I/O, an indicator on how the received message is retuned for network input operation (i.e., the SUT receives an input message) (for example, as a returned value of a function/method, or storing in a parameter of a function/method), and an indicator on how message to be sent is nominated in network output operation (i.e., the SUT sends an output message) (for example, storing in a parameter of a function/method). After the code pattern has been determined, not only input and output function names may be known so that watch-points may be set, but also the positions of variables for storing input and output messages may be known either. For example, when the input function is invoked, a watch-point will be set for the variable for storing the input message, and when the output function is invoked, the variable for storing the output message is determined.

After the watch-points have been set for the input and output functions, the SUT starts to run on the test platform. When it is determined based on the set watch-point that the input function is invoked to receive the input message, a watch-point will be set to the variable for storing the input message.

For example, because a watch-point has been set to the input function, it may be monitored that an input message is received through invoking the input function, so that the variable for storing the input message has relation to the input message, and another watch-point needs to be set to it to monitor the variable. Further, a tag corresponding to the input message needs to be assigned to the variable to indicate the variable relating to which input message. The tag corresponding to the input message may be a message ID of the input message, a character string of the input message, or other forms that can be conceived of by those skilled in the art, through which the corresponding input message can be retrieved. Further, those skilled in the art may understand that the variable for storing an input message may be a variable representing an address space for storing the input message or a variable pointing to the address space.

Further, when it is determined based on the set watch-point that an output message is sent through invoking the output function, correlation between the output message and an input message is determined based on a tag associated with the variable for storing the output message.

For example, because a watch-point has been set to the output function, whether an output message is sent through invoking the output function may be monitored. Through viewing a tag associated with the variable for storing the output message, an input message corresponding to the tag can be found, thereby it can be determined which input message or messages has association with the output message.

According to an embodiment of the present invention, a tag associated with a variable for storing an output message may comprise a tag directly associated with the variable for storing the output message, a tag associated with the variable for storing the output message through a branch identifier contained in a stack corresponding to a thread where the variable is located, or the both. As described in detail hereinafter, through a watch-point variable list, a tag directly associated with a variable in the list can be determined. Further, because the invoking of the output function may occur in a conditional branch after a conditional decision statement, a tag that is indirectly associated with a variable in the conditional branch can be determined through a branch identifier pushed into a stack, that is, the tag indirectly associated with the variable is the tag directly associated with the branch identifier of the conditional branch where the variable is located. The tag directly associated with the branch identifier may be a tag that is associated with the branch identifier when it is pushed into the stack, as described hereinafter. Similarly, those skilled in the art may understand that a variable for storing an output message may be a variable representing an address space for storing the output message or a variable pointing to the address space.

During the execution of step S210, there may be a new variable to which a new watch-point is set. Step S210 is repeatedly executed due to the appearance of new watch-points, so that watch-points in the test platform can be updated to allow all variables having relations with an input message to be tracked and monitored. When a variable is related to an input message, the input message can be associated with the variable by a tag corresponding to the input message after the tag is assigned to the variable. In this way, variables related to the same input message can be associated with the same tag, and the same variable may be associated with multiple tags due to influences by multiple input messages. At step S220, since an output message is represented by a certain variable in the SUT, the output message can be associated with corresponding input messages through tags, which may include a tag directly associated with the variable and/or a tag indirectly associated with the variable through a branch identifier that is still remained in a stack of a thread in which the variable is located, and thus the correlation between input and output messages can be determined.

According to the method of determining correlation between input and output messages provided in the embodiment of the present invention, through setting watch-points, variables having relation to input messages can be tracked without paying attention to the specific execution flow inside source codes, and through assigning tags, different variables influenced by the same input message can be associated with the same tag. Thus, correlation between input and output messages can be determined simply and conveniently with watch-points and tags, and semantic analysis from the semantic level can be avoided.

Next, an example of the implementation system 300 of determining correlation between input and output messages shown in FIG. 3 will be described, and the method 400 and the method 500 of determining correlation between input and output messages will be described in more detail with the system 300 shown in FIG. 3 in conjunction with FIG. 4 and FIG. 5.

Figure 3:
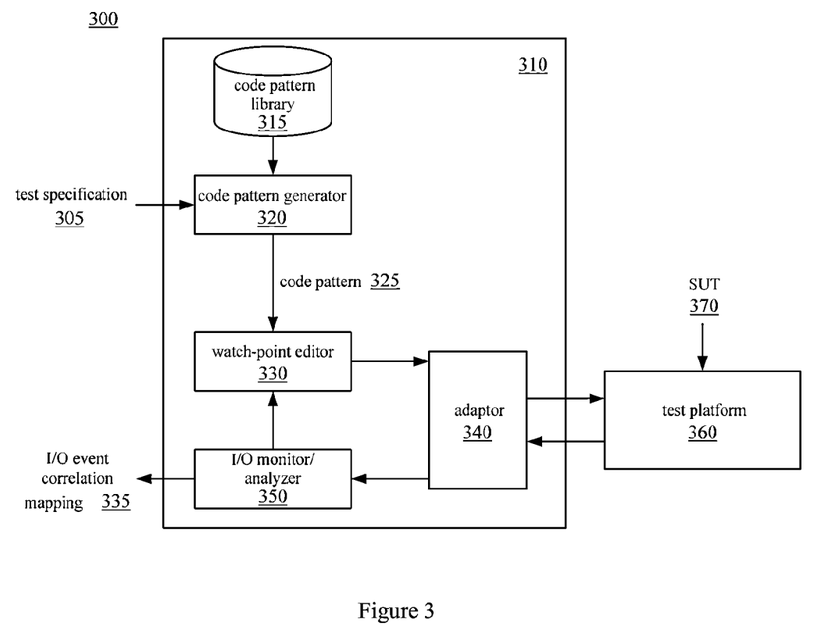
FIG. 3 shows an example of an implementation system for determining correlation between input and output messages.

Referring to FIG. 3, the system 300 of determining correlation between input and output messages comprises a system 310 for implementing the method 200 and a test platform 360 for loading an SUT 370. The SUT 370 runs in the test run time environment of the test platform 360. Although the system 310 and the test platform 360 are shown separately in FIG. 3, those skilled in the art may understand that a part or all of the system 310 can be integrated into the test platform 360, becoming a component of the test run time environment.

For example, after a development of a product is completed, it is necessary for a tester to perform functional test on the developed product to determine whether it meets design requirements. At this time, the product needed be tested is the SUT 370 shown in FIG. 3.

The tester may input concerned network protocols supported by the SUT 370 (such as, TCP (Transmission Control Protocol), UDP (User Datagram Protocol), etc.), programming languages of the SUT 370 (such as C++, Java, etc.) and a target operating system of the SUT 370 (such as, Linux, Unix, etc.) as a test specification 305 into a code pattern generator 320. The code pattern generator 320 searches a predefined code pattern library 315 according to the received test specification to find out a code pattern 325 in conformity to the test specification, wherein the code pattern 325 can be also referred to as a network I/O pattern. With the code pattern, an input function for receiving input messages and an output function for sending output messages of the SUT 370 can be determined under the corresponding test specification.

The code pattern generator 320 sends the code pattern 325 determined according to the test specification to a watch-point editor 330. The watch-point editor 330 determines input and output functions for which watch-points need to be set according to the code pattern 325, and notifies the test platform 360 of the input and output functions that need to be set with watch-points, to enable the test platform 360 to set watch-points to the input and output functions of the SUT 370 after the SUT 370 is loaded.

In addition to setting watch-points for the input and output functions according to the code pattern 325, the watch-point editor 330 needs to set new watch-points or delete watch-points that have been set according to information fed back by an I/O monitor/analyzer 350, which will be described in detail hereinafter. When the watch-point editor 330 needs to set a watch-point, the watch-point editor 330 sends a watch-point adding command to the test platform 360 to instruct the test platform 360 to add a watch-point at a corresponding location in the SUT 370. When the watch-point editor 330 needs to delete a watch-point that has been set, the watch-point editor 330 sends a watch-point deleting command to the test platform 360 to instruct the test platform 360 to delete a watch-point at a corresponding location.

The so-called "watch-point" refers to a location that needs to be monitored in the SUT 370, i.e., in the code of the SUT 370. When the SUT 370 proceeds to a watch-point, the test platform 360 is triggered to send a notification to the system 310, causing the I/O monitor/analyzer 350 to perform related operations. When the I/O monitor/analyzer 350 determines that a watch-point is to be added or deleted according to the received notification, the I/O monitor/analyzer 350 sends information to the watch-point editor 330, causing the watch-point editor 330 to set or delete a watch-point through sending a watch-point adding command or a watch-point deleting command.

Since the watch-point adding command or the watch-point deleting command generated by the watch-point editor 330 may not be recognized by the test platform 360, it is required to provide an adaptor 340 in such a case, so that these commands can be converted into commands that can be recognized by the test platform 360. Similarly, since notifications sent to the system 310 by the test platform 360 based on watch-points set in the SUT 370 may not be recognized by the I/O monitor/analyzer 350, in such a case, the adaptor 340 is also required to convert the notifications sent by the test platform 360 into the ones that can be recognized by the I/O monitor/analyzer 350. Obviously, those skilled in the art may understand that the adaptor 340 is not necessary when the system 310 and the test platform 360 can recognize information communicated there-between.

Logically, there may be two lists provided by the I/O monitor/analyzer 350. One list is an input-message list utilized for recording tags that are assigned to input messages (for example, message IDs, or other message identifiers corresponding to input messages), and the other list is a watch-point variable list utilized for recording association between variables having watch-points set thereon and tags (for example, message IDs). For example, when a variable corresponding to a watch-point is influenced by an input message having a message ID "e" directly or indirectly, the tag "e" is assigned to the variable to associate the variable with the input message having the message ID "e". A variable having a watch-point set thereon are also called as a watch-point variable hereinafter. A watch-point variable is a variable to be monitored, and when the watch-point variable is processed by some operation, the test platform 360 sends a corresponding notification to the system 310.

The I/O monitor/analyzer 350 receives notifications sent by the test platform 360 based on watch-points and performs corresponding processes.

When the I/O monitor/analyzer 350 receives a notification, indicating that an input function is invoked to receive an input message, sent by the test platform 360 based on a watch-point set on the input function, the I/O monitor/analyzer 350 assigns a message ID (in this example, it is represented by the message ID "e") to the input message, notifies the watch-point editor 330 to set a watch-point for a variable that is utilized for storing the input message, and assigns the message ID "e" to the variable as a tag in the watch-point variable list.

When the I/O monitor/analyzer 350 receives a notification, indicating that a read operation is performed on a variable "p" in a conditional decision statement, sent by the test platform 360 based on a watch-point set on the variable "p", the I/O monitor/analyzer 350 checks all the variables on which write operations are performed in a conditional branch executed following the conditional decision statement. If there are some written variables having no watch-point set thereon, it is necessary to instruct the watch-point editor 330 to perform watch-point setting on them, and add them into the watch-point variable list. On the other hand, if there are some written variables already having the watch-points set thereon, the watch-points are kept. Further, the I/O monitor/analyzer 350 may assign a branch ID for the conditional branch to be executed, associate the branch ID with a tag associated with the variable p, and push the branch ID into a stack corresponding to the current thread. Correlation between the branch ID and the variable "p" can be recorded in the following manner. For example, the branch ID and the tag associated with the variable "p" can be correspondingly recorded in the watch-point variable list or other storage spaces, or the branch ID and the associated tag of the variable "p" can be pushed into the stack together as an entirety. Herein, the "stack" refers to a stack provided in the I/O monitor/analyzer 350, and each thread has its own stack in a one-to-one correspondence. In this case, the I/O monitor/analyzer 350 notifies the watch-point editor 330 to set a watch-point on the exit point of the branch.

When the I/O monitor/analyzer 350 receives a notification, indicating that the exit point of the branch is reached, sent by the test platform 360 based on the watch-point set on the exit point of the branch, the I/O monitor/analyzer 350 pops the branch ID that has been pushed into the stack of the current thread. Further, the I/O monitor/analyzer 350 may notify the watch-point editor 330 to delete the watch-point set on the exit point, and clear the association between the branch ID of the branch and its tags.

When the I/O monitor/analyzer 350 receives a notification, indicating that a read operation is operated on a variable "p" in a non-conditional decision statement, sent by the test platform 360 based on the watch-point set on the variable p, if the value of the variable "p" is read into for example a variable "q", the I/O monitor/analyzer 350 adds the variable "q" into the watch-point variable list, and assigns the variable "q" with the same tag as that of the variable "p". In addition, it is required for the watch-point editor 330 to send information to cause the watch-point editor 330 to set a watch-point for the variable "q".

When the I/O monitor/analyzer 350 receives a notification, indicating that a write operation is operated on a variable "p", sent by the test platform 360 based on the watch-point set on the variable "p", the tag associated with the variable "p" in the watch-point variable list is cleared. If there are some variables that are writing the variable "p" have associated tags in the watch-point variable list, the tags are assigned to the variable "p" and the watch-point on the variable "p" is kept. In the case that there is a branch identifier (for example, a branch ID) contained in the stack of the thread where the variable "p" is located, a tag associated with the branch ID is also assigned to the variable "p". If all the variables that are writing the variable "p" do not exist in the watch-point variable list, but a branch identifier is contained in the stack where the variable "p" is located, the tag associated with the branch identifier is assigned to the variable "p" and the watch-point on the variable "p" is kept. If all the variables that are writing the variable "p" do not exist in the watch-point variable list, and no branch identifier is contained in the stack of the thread where the variable "p" is located, the variable "p" has no tag associated with it and the variable "p" can be removed from the watch-point variable list. At that time, the watch-point editor 330 may be instructed to remove the watch-point set on the variable "p" in the SUT 370 by sending a watch-point deleting command.

When the I/O monitor/analyzer 350 receives a notification, indicating that an output message is to be sent through the invoking of an output function, sent by the test platform 360 based on the watch-point set on the output function, referring to the tag the variable for storing the output message is associated with in the watch-point variable list and/or the tag the branch ID still remained in the stack of the thread where the variable is located is associated with, correlation between the output message and input messages may be determined, and the correlation may be output as the I/O event correlation mapping 335 to the tester. In the I/O event correlation mapping 335, a tag corresponding to the output message can be recorded, and the tester may determine the correlation between the output message and input messages by referring to correspondence between tags and input messages recorded in other logs or tables. Which input messages correspond to the output message can also be directly recorded in the I/O event correlation mapping 335. At that time, the I/O monitor/analyzer 350 outputs the correlation result after converting tags into the corresponding input messages according to the input-message list. Obviously, since input messages have been associated with the output message through tags, those skilled in the art may easily conceive of other manners to output the result, allowing the tester to determine the correlation between input and output messages.

Next, a specific operation flow of the system 300 will be described in more detail in conjunction with FIG. 4 and FIG. 5.

Figure 4:
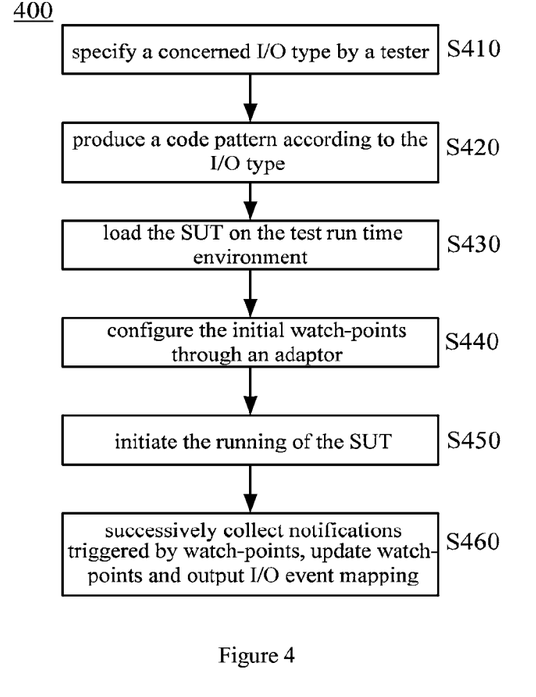
FIG. 4 shows a flow chart of another method for determining correlation between input and output messages according to an embodiment of the present invention.

Referring to FIG. 4, at step S410, if the programming language and the operation system of the SUT 370 are given and remain unchanged, the tester may specify the concerned network I/O types (for example, UDP, TCP, HTTP (Hypertext Transfer Protocol), etc.) and input a test specification to the code pattern generator 320.

At step S420, the code pattern generator 320 produces a code pattern 325 through retrieving the code pattern library 315 according to the test specification.

At step S430, the SUT 370 is loaded to the test platform 360. Herein, specifically, it means loading the package or code of the SUT 370 to the test run time environment of the test platform 360.

At step S440, the watch-point editor 330 obtains the initial watch-points (such as, input and output functions) according to the code pattern 325 sent by the code pattern generator 320.

For example, a static rule can be preset, in which network input and output are methods of a specific class, and then those methods of the specific class may function as the initial watch-points. Next, the watch-point editor 330 sends a watch-point adding command to the test platform 360 through the adapter 340 to set watch-points for the input and output functions of the SUT 370.

At step S450, the test platform 360 initiates the running of the SUT 370.

At step S460, the I/O monitor/analyzer 350 successively collects notifications that are triggered by watch-points, updates variables in the watch-point variable list and their associated tags that are corresponding to input messages, and instructs the watch-point editor 330 to update watch-points. When the correlation between output and input messages is obtained, the I/O monitor/analyzer 350 outputs the result 335 to the tester.

Although step S430 is executed after steps S410 and S420 in the method shown in FIG. 4, step S430 may also be executed before step S410 and/or step S420 or between step S410 and step S420; the time at which step S430 is executed is independent to step S410 and step S420, so long as it is executed before step S440.

Figure 5:
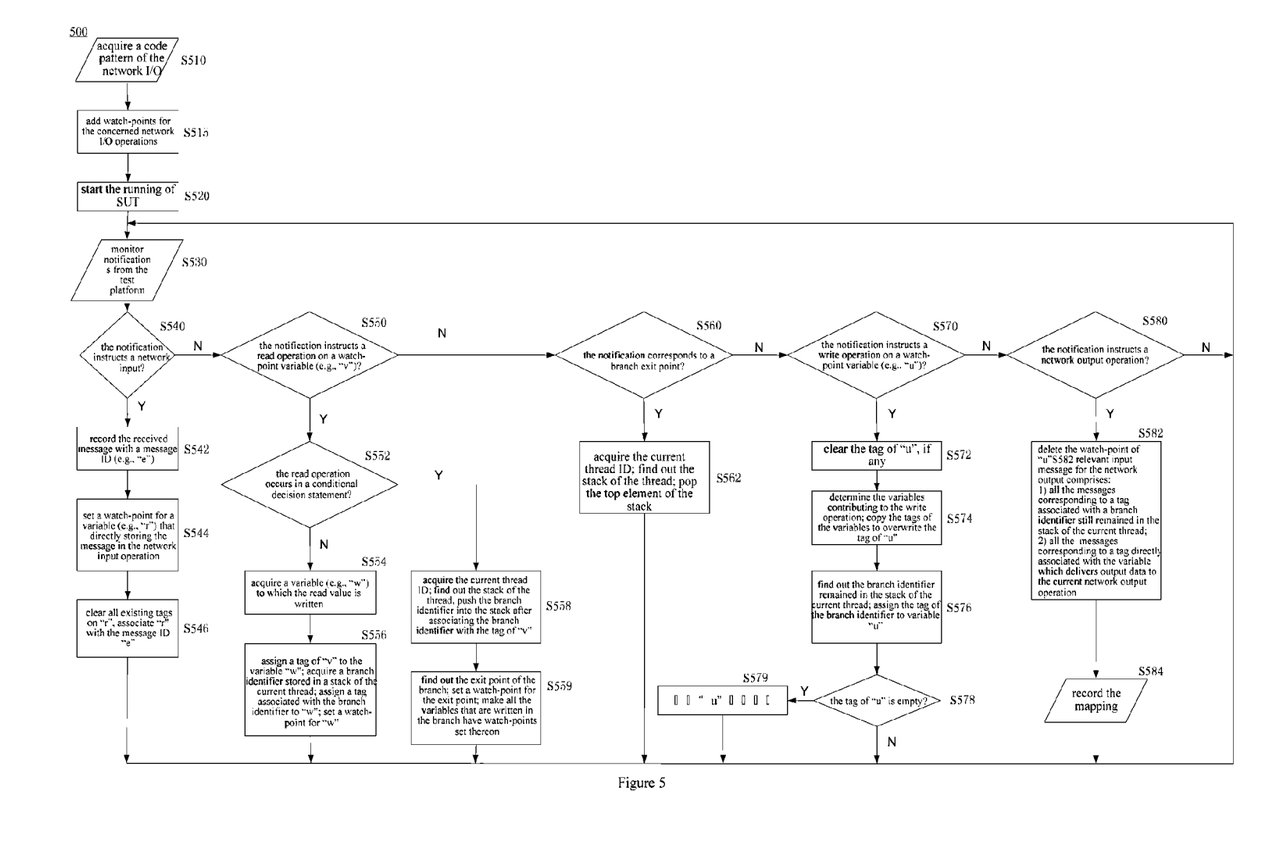
FIG. 5 shows a flow chart of still another method for determining correlation between input and output messages according to an embodiment of the present invention.

Referring to FIG. 5, the processes for different notifications received by the I/O monitor/analyzer 350 will be described.

At step S510, the watch-point editor 330 obtains the code pattern 325 of the network I/O.

At step S515, the watch-point editor 330 adds watch-points for concerned network I/O operations (for example, input and output functions under the UDP protocol).

At step S520, the test platform 360 initiates the running of the SUT 370.

At step S530, the I/O monitor/analyzer 350 monitors a notification sent from the test platform 360 based on watch-points.

At step S540, the I/O monitor/analyzer 350 determines whether the notification indicates the network input, i.e., receiving input message. If it is determined that the notification indicates the network input, the flow proceeds to step S542, and otherwise, the flow proceeds to step S550.

At step S542, the I/O monitor/analyzer 350 utilizes a message ID (for example, "e") to record the received input message.

At step S544, the I/O monitor/analyzer 350 instructs the watch-point editor 330 to set a watch-point for a variable (for example, "r") that directly stores the message.

At step S546, if the variable "r" has already been associated with a tag in the watch-point variable list, the tag is deleted and a tag "e" is assigned to the variable "r".

At step S550, the I/O monitor/analyzer 350 determines whether the notification indicates a read operation is performed on a watch-point variable (for example, "v") on which a watch-point has been set. If so, the flow proceeds to step S552; otherwise, the flow proceeds to step S560.

At step S552, the I/O monitor/analyzer 350 judges whether the read operation occurs in the conditional decision statement. If the read operation occurs in a conditional decision statement, the flow proceeds to step S558; otherwise the flow proceeds to step S554.

At step S554, a variable to which the value read by the read operation is written is obtained (for example, "w").

At step S556, the I/O monitor/analyzer 350 instructs the watch-point editor 330 to set a watch-point for the variable "w", adds the variable "w" into the watch-point variable list, and assigns the same tag as that of the variable "v" to the variable "w". If there is a branch ID stored in a stack corresponding to the current thread, a tag associated with the branch ID is also assigned to the variable "w".

At step S558, the I/O monitor/analyzer 350 obtains a current thread ID of the read operation, finds out a stack corresponding to the thread, associates a branch ID (for example, "p") of a conditional branch executed after the conditional decision with the tag of the variable "v", and pushes the branch ID "p" into the stack corresponding to the thread.

At step S559, the I/O monitor/analyzer 350 determines the exit point of the conditional branch, and instructs the watch-point editor 330 to set a watch-point at the exit point. In addition, the I/O monitor/analyzer 350 may instruct the watch-point editor 330 to set watch-points for the variables that have no watch-points set thereon among all the variables written in the branch, so that all the variables written in the branch have watch-points set thereon.

At step S560, the I/O monitor/analyzer 350 determines whether the notification indicates that the flow has reached the exit point of the conditional branch. If so, the flow proceeds to step S562; otherwise, the flow proceeds to step S570.

At step S562, the I/O monitor/analyzer 350 obtains the ID of a current thread, finds out a stack corresponding to the thread, and pops the top element in the stack.

At step S570, the I/O monitor/analyzer 350 determines whether the notification indicates a write operation is performed on a watch-point variable (for example, "u") on which a watch-point has been set. If so, the flow proceeds to step S572; otherwise the flow proceeds to step S580.

At step S572, the I/O monitor/analyzer 350 clears, if any, all the tags associated with the variable "v" in the watch-point variable list.

At step S574, the I/O monitor/analyzer 350 determines the source variables of the write operation, that is, the variables which are written to the variable "u", and utilizes tags of those variables as tags of the variable "u".

At step S576, the I/O monitor/analyzer 350 finds out branch IDs kept in the stack of the current thread, and utilizes tags associated with those branch IDs as tags of the variable "u" as well.

At step S578, the I/O monitor/analyzer 350 determines whether the tag of the variable "u" is empty. If so, the flow proceeds to step S579; otherwise the flow returns to step S530.

At step S579, the I/O monitor/analyzer 350 instructs the watch-point editor 330 to delete the watch-point set on the variable "u". Further, the I/O monitor/analyzer 350 may delete the variable "u" from the watch-point variable list.

At step S580, the I/O monitor/analyzer 350 determines whether the notification indicates the network output, i.e., sending an output message. If the notification indicates the network output, the flow proceeds to step S582; otherwise the flow returns to the step S530.

At step S582, the I/O monitor/analyzer 350 determines that the following two types of input messages have correlation with the output message: all the input messages corresponding to a tag associated with a branch ID still remained in the stack of the current thread, and all the input messages corresponding to a tag directly associated with a variable which delivers output data to the current network output operation.

At step S584, the correlation between the input messages and the output message is recorded and outputted to a tester.

Figure 6:
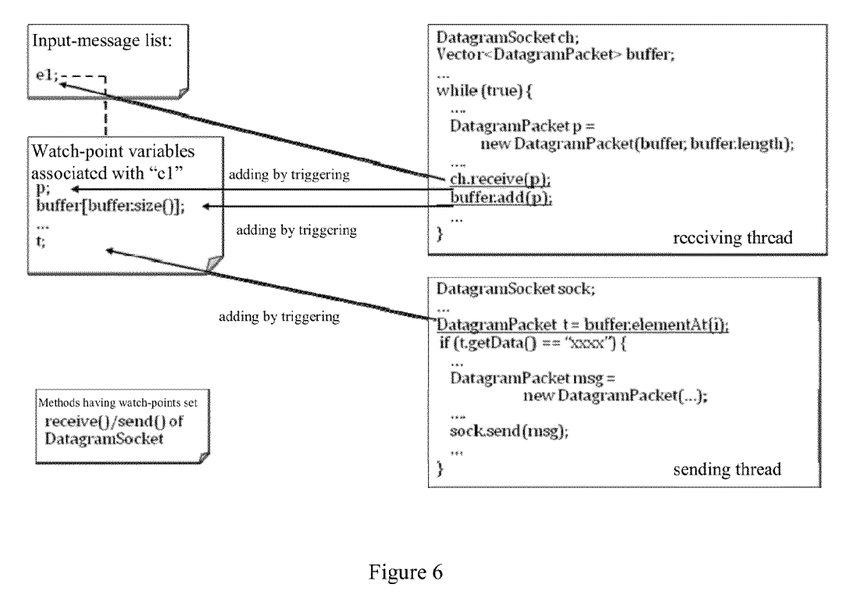
FIG. 6 shows an example illustrating a specific implementation of the method according to an embodiment of the present invention.

Below, an example of how to set a watch-point and assign a tag will be described with a simplified code.

Referring to FIG. 6, watch-points are preset to receive( ) and send( ) of DatagramSocket. When an input message is received through invoking ch.receive( ) in a receiving thread, a message ID "e1" is assigned to the input message and is recorded in a input-message list. Since the input message is stored in a variable "p", a watch-point is set on variable "p", which is added into a watch-point variable list and is associated with tag "e1". When the variable "p" is added into the buffer, since the space of buffer[buffer.size( )] in the buffer is related to the input message, a watch-point is set to the space, which is added into the watch-point variable list and associated with the tag "e1".

In a sending thread, when the input message is read from the buffer and assigned to a variable "t", since the variable "t" is related to the input message after such an operation, a watch-point is set on the variable "t", and the variable "t" is added into the watch-point variable list and is associated with the tag "e1".

In this example, the variable "t" is manipulated in a conditional decision statement to control whether to execute the corresponding conditional branch, and thus a thread ID is recorded, and a branch identifier "c1" of the conditional branch (which may also be considered as the identifier "c1" corresponding to the conditional decision statement) is associated with the tag "e1" and is pushed into a stack corresponding to the thread. In addition, a watch-point is set on the exit point of the conditional branch. If sock.send( ) is in the same thread as the conditional decision and within the branch identified by the branch identifier, an output message "msg" is related to the tag "e1". When it proceeds to the exit point of the conditional branch, "c1" is popped from the stack.

The above method for determining the correlation between input and output messages can be employed in a distributed system, for example, to perform functional tests on various nodes in the IOT. The above method can also be utilized in other networks to perform functional tests on different forwarding devices or subsystems formed by different forwarding devices in those networks. Obviously, those skilled in the art may conceive of other situations of employing the above method, through which correlation can be determined without the need of semantic analysis on input and output messages.

It can be seen from the detailed description of the above method for determining correlation between input and output messages that there is very little human intervention in the process. Expansibility for different programming languages and test platforms is realized through the implementation of the adapter. Further, it is merely required to set initial watch-points according to a code pattern at the beginning, and then automatic watch-point update is performed according to notifications returned from the test platform based on watch-points during the running of the SUT, so that the correlation between input and output messages can be determined without the need of learning about particular details of the source code, leading to simple implementation.

Next, structural block diagrams of devices 700 and 800 for determining correlation between input and output messages in an SUT according to an embodiment of the present invention will be described with reference to FIG. 7 and FIG. 8, in which the SUT is provided with preset watch-points, and when the SUT is running, the running of the SUT is detected through watch-points in the SUT.

Figure 7:
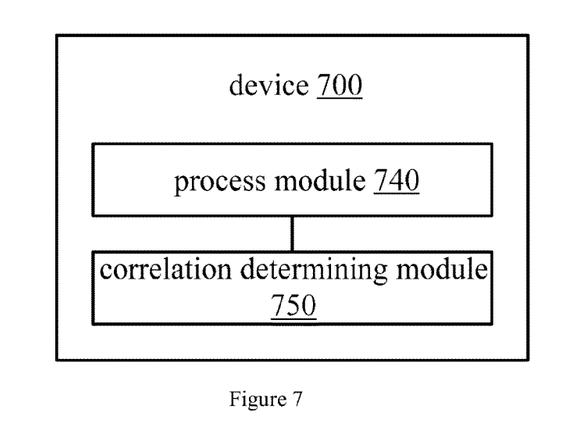
FIG. 7 shows a structural block diagram of a device for determining correlation between input and output messages according to an embodiment of the present invention.

Referring to FIG. 7, the device 700 comprises a process module 740 and an correlation determining module 750. The process module 740 can be utilized, when it is determined that a variable is related to an input message according to the set watch-point, to associate the variable with a tag corresponding to the input message and make the variable set with a watch-point. The correlation determining module 750 can be utilized for determining correlation between the output message and an input message according to a tag associated with the variable for storing the output message.

Reference can be made to the detailed description of the above methods 200, 400 and 500, and the system 300 of FIG. 3 for the above and other operations and/or functions of the process module 740 and the correlation determining module 750, which will not be described in detail to avoid repetition.

According to the device for determining correlation between input and output messages provided in an embodiment of the present invention, through setting watch-points, variables having relation to input messages can be tracked without paying attention to the specific execution flow inside source codes, and through assigning tags, different variables influenced by the same input message can be associated with the same tag. Thus, correlation between input and output messages can be determined simply and conveniently with watch-points and tags, and semantic analysis from the semantic level can be avoided.

Figure 8:
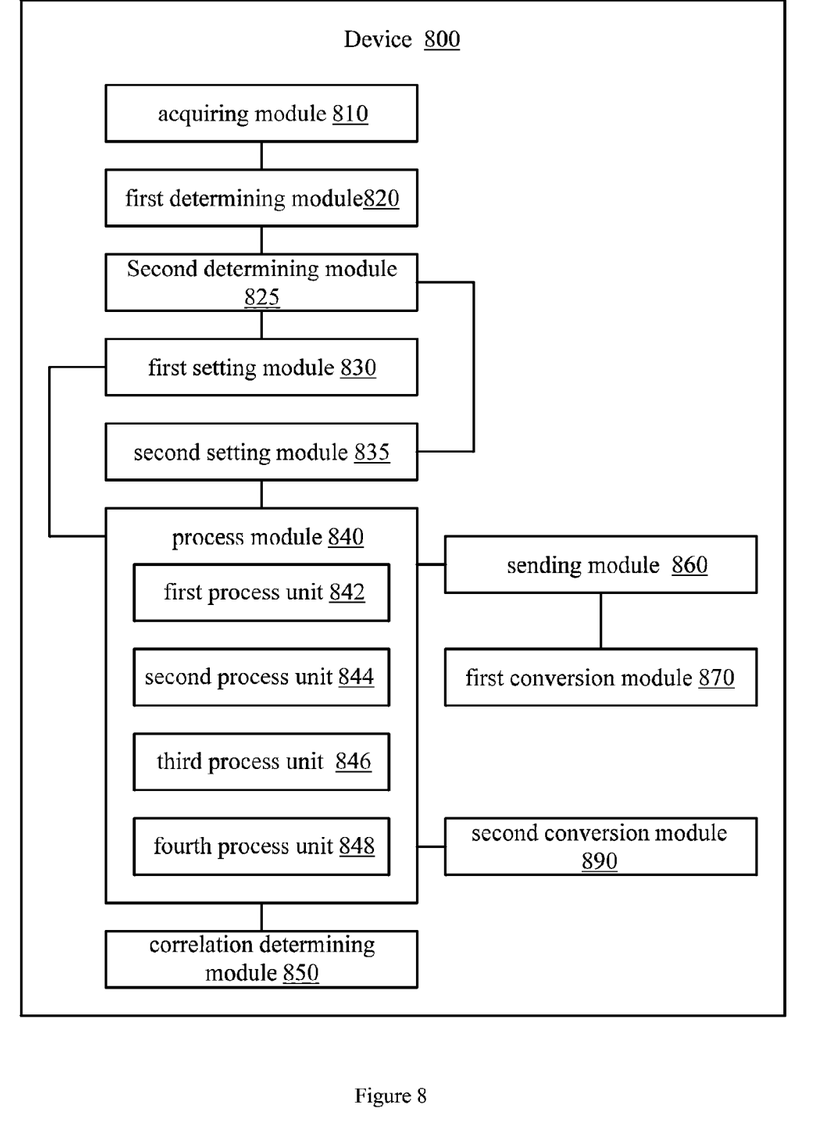
FIG. 8 shows a structural block diagram of another device for determining correlation between input and output messages according to an embodiment of the present invention.

Referring to FIG. 8, the process module 840 and the correlation determining module 850 contained in the device 800 are substantially the same as the process module 740 and the correlation determining module 750 contained in the device 700 as shown in FIG. 7.

According to an embodiment of the present invention, the device 800 may further comprise a first setting module 830, which can be utilized for presetting the watch-point on an input function for receiving the input message. In this case, the variable associated with the input message includes the variable for storing the input message, which is the variable detected when it is determined based on the preset watch-point that the input function is invoked to receive the input message.

According to an embodiment of the present invention, the device 800 may further comprise a second setting module 835. The second setting module 835 can be utilized for presetting the watch-point on an output function for sending the output message. In this case, the variable for storing the output message is the variable detected when it is determined based on the preset watch-point that the output function is invoked to send the output message.

In the case of presetting watch-points for input and output functions, the process module 840 can be utilized for associating the variable for storing the input message with a tag corresponding to the input message when it is determined that the input function is invoked to receive the input message according to the set watch-point, and set a watch-point for the variable. The correlation determining module 850 can be further utilized for determining correlation between the output message and an input message according to a tag associated with the variable for storing the output message when it is determined that the output function is invoked to send the output message according to the set watch-point. According to an embodiment of the present invention, the device 800 may further comprise an acquiring module 810, a first determining module 820, and a second determining module 825. The acquiring module 810 can be utilized for, before the watch-points for the input function for receiving input messages and the output function for sending output messages are preset by the first setting module 830 and the second setting module 835, acquiring a test specification of the SUT. The first determining module 820 can determine a code pattern according to the test specification. The second determining module 825 can determine the input and output functions for which watch-points are required to be set according the code pattern. Thus, the setting module 830 performs watch-point setting on the input and output functions only after the input and output functions have been determined by the second determining module 825.

According to an embodiment of the present invention, the process module 840 may further comprise a first process unit 842, such as a processing segment. In the case that the read operation does not occur in a conditional decision statement the first process unit 842 can, when it is determined based on the set watch-point that a read operation is performed on the variable corresponding to the set watch-point, set a watch-point for another variable to which the variable corresponding to the set watch-point is written, and associate the other variable with a tag associated with the variable corresponding to the set watch-point.

According to an embodiment of the present invention, the process module 840 may comprise a second process unit 844, such as a processing segment. In the case that the read operation occurs in the conditional decision statement the second process unit 844 can, when it is determined based on the set watch-point that a read operation is performed on the variable corresponding to the set watch-point, make a variable in an executed conditional branch on which a written operation is performed set with a watch-point, and set a watch-point on the exit point of the conditional branch, push a branch identifier of the conditional branch into a stack corresponding to a thread where the conditional branch is located, and associate the branch identifier with the tag associated with the variable corresponding to the set watch-point.

According to an embodiment of the present invention, when the process module 840 comprises a second process unit 844, the process module 840 may further comprise a third process unit 846, such as a processing segment. The third process unit 846 can, when it is determined based on the watch-point set on the exit point of the conditional branch that the exit point of the conditional branch is reached, pop the branch identifier from the stack.

According to an embodiment of the present invention, the device 800 may further comprise a sending module 860 and a first conversion module 870. The first conversion module 870 can convert a watch-point adding command into a command recognizable by the test platform on which the SUT is loaded, to enable the test platform to add the watch-point to the SUT. The sending module 860 can send the watch-point adding command to the test platform to set the watch-point. Thus, when it is necessary to set a watch-point for an input function, an output function, a variable, or the exit point of a conditional branch, it can be realized through sending a watch-point adding command by the sending module 860.

According to an embodiment of the present invention, the process module 840 may comprise a fourth process unit 848, such as a processing segment. In the case that the variable corresponding to the set watch-point is still related to an input message after the write operation the fourth process unit 848 can, when it is determined based on the set watch-point that a write operation is performed on the variable corresponding to the set watch-point, keep the watch-point set on the variable corresponding to the set watch-point, associate the variable with a tag corresponding to the related input message, and in the case that there is a branch identifier contained in a stack of a thread where the variable is located, associate the variable with a tag associated with the branch identifier; and in the case that the variable corresponding to the set watch-point is no longer to be related to an input message after the write operation, deleting the watch-point corresponding to the variable. For example, the fourth process unit 848 may change a tag associated with the variable to a tag associated with a source variable of the write operation, so that the variable can be associated with the tag of the related input message.

According to an embodiment of the present invention, the device 800 may comprise a second conversion module 890. The second conversion module 890 can convert a watch-point deleting command into a command recognizable by the test platform on which the SUT is loaded, to enable the test platform to delete the watch-point from the SUT. In such a case, the fourth process unit 848 can send the watch-point deleting command to the test platform to delete the watch-point corresponding to the variable.

According to an embodiment of the present invention, the tag associated with the variable for storing the output message may comprise at least one of a tag directly associated with the variable for storing the output message and a tag associated with the variable for storing the output message through a branch identifier contained in a stack of a thread wherein the variable is located.

Reference can be made to the description of the above methods 200, 400, 500 and the system 300 of FIG. 3 for the above and other operations and/or functions of various modules and units, which will not be described in detail to avoid repetition. For example, the acquiring module 810, the first determining module 820, and the second determining module 825 can be realized by the code pattern generator 320; the first setting module 830, the second setting module 835, the process module 840, the correlation determining module 850, and the sending module 860 can be realized by the watch-point editor 330 and the I/O monitor/analyzer 350; and the first conversion module 870 and the second conversion module 890 can be realized by the adapter 340. In addition, the process module 840 may comprise all of the various process units, or may comprise a part of them.

There is very little human intervention in the process of determining correlation between input and output messages with the device 800 according to embodiments of the present invention. Expansibility for different programming languages and test platforms is realized by utilizing the adapter. Further, it is merely required to set initial watch-points according to a code pattern at the beginning, and then automatic watch-point update is performed according to notifications returned from the test platform based on watch-points during the running of the SUT, so that the correlation between input and output messages can be determined without the need of learning about particular details of the source code, leading to simple implementation.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method for determining correlation between input and output messages in a system under test (SUT) having preset watch-points in a test platform, the method comprising:
   upon detecting a message input operation,
      finding a variable that stores an input message,
      associating said variable with a tag of said input message, and
      adding a watch-point for said variable in said test platform;
   in response to detecting a message input operation;
      setting a watch-point for another variable to which said variable corresponding to said set watch-point is written; and
      associating said other variable with a tag associated with said variable corresponding to said set watch-point;
   wherein the setting and associating steps are executed (i) when it is determined that a read operation is performed on a variable corresponding to said set watch-point and (ii) if said read operation does not occur in a conditional decision statement; and
   upon detecting network output operation,
      finding a variable that stores an output message of said SUT, and
      determining correlation between said output message and an input message according to a tag associated with said variable storing the output message.

2. The method according to claim 1, further comprising the step of presetting a watch-point on an input function for receiving said input message, wherein:
   said variable associated with said tag of said input message includes a variable for storing said input message, and
   said variable that stores said input message is detected when it is determined based on said pre-set watch-point that said input function is invoked to receive said input message.

3. The method according to claim 1, further comprising the step of pre-setting a watch-point on an output function for sending said output message, wherein said variable that stores said output message is detected when it is determined based on said preset watch-point that said output function is invoked to send said output message.

4. The method according to claim 1, wherein said tag associated with said variable that stores said output message comprises at least one of:
   a tag directly associated with said variable for storing said output message; and
   a tag associated with said variable for storing said output message through a branch identifier contained in a stack of a thread where said variable is located.

5. A method for determining correlation between input and output messages in a system under test (SUT) having preset watch-points in a test platform, the method comprising:
   upon detecting a message input operation,
      finding a variable that stores an input message,
      associating said variable with a tag of said input message, and
      adding a watch-point for said variable in said test platform;
   in response to detecting a message input operation:
      making a variable in an executed conditional branch on which a written operation is performed set with a watch-point;
      setting a watch-point on an exit point of said conditional branch;
      pushing a branch identifier of said conditional branch into a stack corresponding to a thread where said conditional branch is located; and
      associating said branch identifier with said tag associated with said variable corresponding to said set watch-point;
   wherein the making, setting, pushing, and associating steps are executed (i) when it is determined that a read operation is performed on a variable corresponding to said set watch-point and (ii) if said read operation does not occur in a conditional decision statement; and
   upon detecting network output operation,
      finding a variable that stores an output message of said SUT, and
      determining correlation between said output message and an input message according to a tag associated with said variable storing the output message.

6. The method according to claim 5, further comprising the step of presetting a watch-point on an input function for receiving said input message, wherein:
   said variable associated with said tag of said input message includes a variable for storing said input message, and
   said variable that stores said input message is detected when it is determined based on said pre-set watch-point that said input function is invoked to receive said input message.

7. The method according to claim 5, further comprising the step of pre-setting a watch-point on an output function for sending said output message, wherein said variable that stores said output message is detected when it is determined based on said preset watch-point that said output function is invoked to send said output message.

8. The method according to claim 5, further comprising:
   popping said branch identifier from said stack after setting a watch-point on said exit point of said conditional branch, if it is determined based on said watch-point set on said exit point of said conditional branch that said exit point of said conditional branch is reached.

9. The method according to claim 5, wherein said tag associated with said variable that stores said output message comprises at least one of:
   a tag directly associated with said variable for storing said output message; and
   a tag associated with said variable for storing said output message through a branch identifier contained in a stack of a thread where said variable is located.

10. A method for determining correlation between input and output messages in a system under test (SUT) having preset watch-points in a test platform, the method comprising:
   upon detecting a message input operation,
      finding a variable that stores an input message,
      associating said variable with a tag of said input message, and
      adding a watch-point for said variable in said test platform,
      wherein a watch-point becomes set by executing the steps of:
         converting a watch-point adding command into a command recognizable by a test platform on which said SUT is loaded to enable said test platform to add said watch-point to said SUT; and
         sending said watch-point adding command to said test platform to set said watch-point; and
   upon detecting network output operation,
      finding a variable that stores an output message of said SUT, and
      determining correlation between said output message and an input message according to a tag associated with said variable storing the output message.

11. The method according to claim 10, further comprising the step of presetting a watch-point on an input function for receiving said input message, wherein:
   said variable associated with said tag of said input message includes a variable for storing said input message, and
   said variable that stores said input message is detected when it is determined based on said pre-set watch-point that said input function is invoked to receive said input message.

12. The method according to claim 10, further comprising the step of pre-setting a watch-point on an output function for sending said output message, wherein said variable that stores said output message is detected when it is determined based on said preset watch-point that said output function is invoked to send said output message.

13. The method according to claim 10, wherein said tag associated with said variable that stores said output message comprises at least one of:
   a tag directly associated with said variable for storing said output message; and
   a tag associated with said variable for storing said output message through a branch identifier contained in a stack of a thread where said variable is located.

14. A method for determining correlation between input and output messages in a system under test (SUT) having preset watch-points in a test platform, the method comprising:
   upon detecting a message input operation,
      finding a variable that stores an input message,
      associating said variable with a tag of said input message, and
      adding a watch-point for said variable in said test platform;
   in response to detecting a message input operation:
      keeping said watch-point set on said variable corresponding to said set watch-point,
      associating said variable with a tag corresponding to said related input message, and
      associating said variable said tag associated with said branch identifier if a stack of a thread where said variable is located contains said branch identifier;
   wherein the keeping step and the associating steps are executed (i) when it is determined that a write operation is performed on said variable corresponding to said set watch-point, and (ii) if said variable corresponding to said set watch-point remains related to an input message after said write operation; and upon detecting network output operation,
    finding a variable that stores an output message of said SUT, and
    determining correlation between said output message and an input message according to a tag associated with said variable storing the output message.

15. The method according to claim 14, further comprising the step of presetting a watch-point on an input function for receiving said input message, wherein:
    said variable associated with said tag of said input message includes a variable for storing said input message, and
    said variable that stores said input message is detected when it is determined based on said pre-set watch-point that said input function is invoked to receive said input message.

16. The method according to claim 14, further comprising the step of pre-setting a watch-point on an output function for sending said output message, wherein said variable that stores said output message is detected when it is determined based on said preset watch-point that said output function is invoked to send said output message.

17. The method according to claim 14, wherein the step of associating said variable with a tag corresponding to said related input message comprises:
    changing a tag associated with said variable to a tag associated with a source variable of said write operation.

18. The method according to claim 14, wherein said tag associated with said variable that stores said output message comprises at least one of:
    a tag directly associated with said variable for storing said output message; and
    a tag associated with said variable for storing said output message through a branch identifier contained in a stack of a thread where said variable is located.

19. A method for determining correlation between input and output messages in a system under test (SUT) having preset watch-points in a test platform, the method comprising:
    upon detecting a message input operation,
        finding a variable that stores an input message,
        associating said variable with a tag of said input message, and
        adding a watch-point for said variable in said test platform;
    in response to detecting a message input operation,
        deleting said watch-point corresponding to said variable (i) when it is determined that a write operation is performed on said variable corresponding to said set watch-point, and (ii) if said variable corresponding to said set watch-point does not remain related to an input message after said write operation; and
    upon detecting network output operation,
        finding a variable that stores an output message of said SUT, and
        determining correlation between said output message and an input message according to a tag associated with said variable storing the output message.

20. The method according to claim 19, further comprising the step of presetting a watch-point on an input function for receiving said input message, wherein:
    said variable associated with said tag of said input message includes a variable for storing said input message, and
    said variable that stores said input message is detected when it is determined based on said pre-set watch-point that said input function is invoked to receive said input message.

21. The method according to claim 19, further comprising the step of pre-setting a watch-point on an output function for sending said output message, wherein said variable that stores said output message is detected when it is determined based on said preset watch-point that said output function is invoked to send said output message.

22. The method according to claim 19, wherein the step of deleting said watch-point corresponding to said variable comprises:
    converting a watch-point deleting command into a command recognizable by a test platform on which said SUT is loaded, to enable said test platform to delete said watch-point from said SUT; and
    sending said watch-point deleting command to said test platform to delete said watch-point corresponding to said variable.

23. The method according to claim 19, wherein said tag associated with said variable that stores said output message comprises at least one of:
    a tag directly associated with said variable for storing said output message; and
    a tag associated with said variable for storing said output message through a branch identifier contained in a stack of a thread where said variable is located.

* * * * *